Jan. 9, 1968 J. F. GIEBER 3,362,617
PACKAGE WITH TEAR TAPE OPENING MEANS
Filed May 26, 1966 2 Sheets-Sheet 2
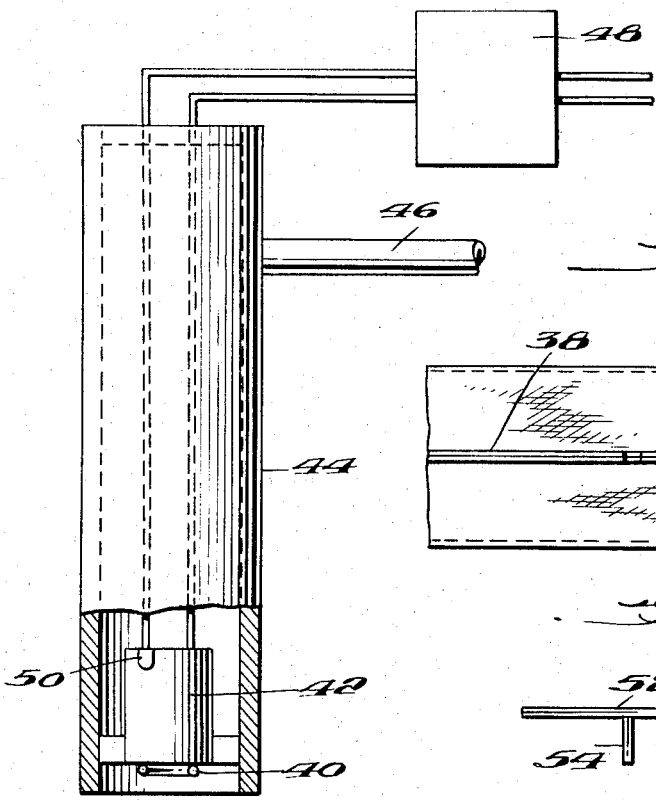
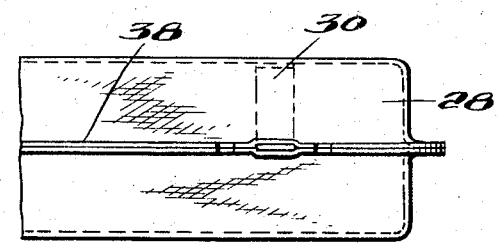
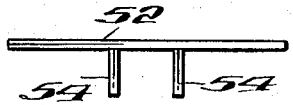
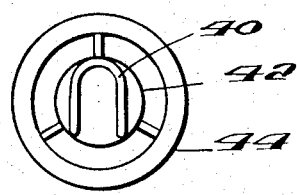

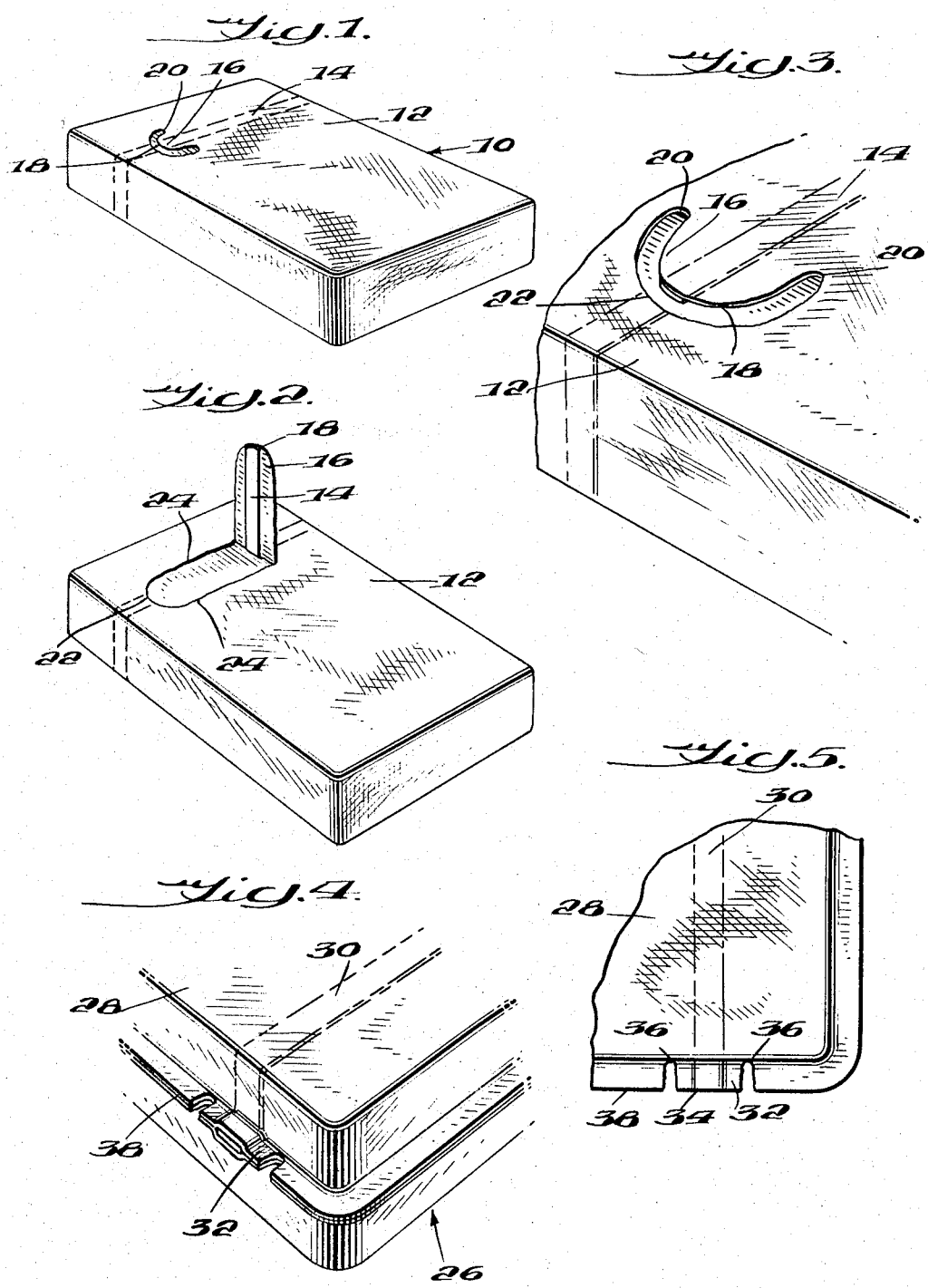

United States Patent Office 3,362,617
Patented Jan. 9, 1968

3,362,617
PACKAGE WITH TEAR TAPE
OPENING MEANS
James Francis Gieber, Wilmington, Del., assignor to
E. I. du Pont de Nemours and Company, Wilmington,
Del., a corporation of Delaware
Filed May 26, 1966. Ser. No. 553,122
2 Claims. (Cl. 229—51)

ABSTRACT OF THE DISCLOSURE

A package with tear tape opening means wherein a polyvinyl chloride tape is adhered to the underside of a polyethylene film overwrap and wherein an end portion of the tape and of an adjacent partially severed portion of the film form a U-shaped tear tab.

---

This invention relates to packaging and more particularly to tear tape opening means for packages fabricated from thermoplastic films.

Thermoplastic films are increasingly being used in packaging products of almost every conceivable type and shape. As would be expected, there has also been an acute need for improved opening means for these packages. This need has become particularly evident with the development of exceptionally durable oriented films formed from organic thermoplastic polymers since the added strength of these films makes opening especially difficult. Particularly with respect to these newer films, the use of known opening means is accompanied by one or more disadvantages among which are difficulty in initiating tear, stretching instead of tearing, destruction of the wrapping film as a result of uncontrolled tear after initiation, premature tear of the film during package handling, and the existence of a weakened lane in the package.

However, according to the present invention, there is provided an opening means that substantially obviates the above mentioned difficulties. The opening means of this invention basically comprises two parts. The first part is a continuous length of thermoplastic tape firmly adhered to one side of the thermoplastic film that is to be torn such that the combined tensile strength of the tape body and the shear strength of the adhesive bond exceeds the tear strength of the corresponding section of thermoplastic film. The second part is a tear tab that is formed along and substantially coextensive with an end portion of the length of tape and is formed out of a partially severed portion of the film. One edge of the tear tab is continuous with the film while the other edge of the tab forms a continuous contour that is separated from the film. Additionally, the region about each end of the edge of the continuous contour is thermally beaded and thus, reinforced. When the tear tab described above is pulled from the film side opposite to that containing the tape and in a direction back along the tape, two substantially parallel tears are made in the film. Using a thermoplastic film having the above described opening means as a package wrapping permits the package to be readily and neatly opened without any of the previously mentioned disadvantages.

A wide variety of films prepared from organic thermoplastic polymers can be used in this invention. Particularly useful films are those such as polyethylene, polypropylene, polyvinyl chloride, polyethylene terephthalate, polymeric amides, polystyrenes, and the like. Reference is made to U.S. Patent 3,175,752 which sets forth a variety of organic thermoplastic polymers that can be employed in preparing useful films.

Furthermore, there is no requirement that the particular film be oriented though the use of oriented films, particularly biaxially oriented films, generally yield the best tears and are also customarily used for structural reasons. However, the tearing means of this invention is effective on nonoriented and uniaxially oriented films as well. A particularly preferred film for use in this invention is manufactured by E. I. du Pont de Nemours and Company under the trademark "Clysar" EH film. "Clysar" EH film is a biaxially oriented heat-shrinkable polyethylene film. When such a biaxially oriented film is used it is preferable to place the tear tape in a direction of axial orientation. Additionally, the tearing means of this invention does not lose its effectiveness if the film, with the tear tape attached, is moderately heat-shrunk. However, for package appearance it is frequently desirable to use a tear tape that will shrink an amount commensurate with that of the film and thus avoid unsightly wrinkling.

As with the film a wide variety of thermoplastic materials can be used as the tear tape. A particularly preferred tape, especially for use with "Clysar" EH film, is a polyvinyl chloride tape manufactured by P. Buyersdorf and Company under the trademark "Tesafilm 117," and characterized as having a high combined tensile and adhesive shearing strength. Additionally, of course, the tape and the film can be of the same material. However, for all applications the tape must have a greater combined tensile and adhesive shear strength than the tearing strength of the equivalent width of film. As is well known the tensile strength of a film or tape is a function of the type of material, its thickness, and its degree of orientation.

The particular method of attaching the tear tape to the film is not critical, however, the tape must be firmly adhered to the film at least along the terminal portions of the tape and preferably along the entire length. Adhesive adhering (i.e. using a pressure sensitive adhesive composition such as a butyl rubber base adhesive to bond the tape to the film) is an especially convenient method for use in this invention. The aforementioned "Tesafilm 117" contains a comparable adhesive composition and can be firmly adhered to a film by finger pressure. Firmly adhering the tear tape to the film at the end containing the tear tab assures a positive attachment and, consequently, a high shear strength of the bond between the tape and film at the points at which tearing is initiated. Such a positive attachment prevents the film from stretching in lieu of the desired tearing. The firm attachment at the opposite end of the tape is necessary to maintain proper alignment and prevent the tape from being pulled out from beneath the film. However, as stated above, the tape is preferably firmly adhered to the film along its entire length.

Referring to the accompaying drawings:

FIGURE 1 is a perspective view of a wrapped article showing the tearing means of this invention.

FIGURE 2 is a perspective view of the wrapped article of FIGURE 1 in a partly opened condition.

FIGURE 3 is an enlarged detail view of the tab of FIGURE 1.

FIGURE 4 is a fragmentary perspective view of a hermetically wrapped article showing the tearing means of this invention.

FIGURE 5 is a fragmentary top plan view of FIGURE 4.

FIGURE 6 is a fragmentary side elevation view of FIGURE 4.

FIGURE 7 is a side elevation view partly in section of an apparatus useful for forming the tab of FIGURE 1.

FIGURE 8 is a bottom plan view of FIGURE 7.

FIGURE 9 is a side elevation view of a sealing bar useful for forming the tab of FIGURE 4.

FIGURE 10 is a bottom plan view of FIGURE 9.

Referring to FIGURE 1 a package 10 is shown wrapped with a thermoplastic film 12. A tear tape 14 is firmly adhered to the film 12 on the side facing the contents of the package 10. While the tape in this figure is shown to completely surround the package, this condition is not always necessary. In fact quite frequently it may be desirable to only tear a portion of a surface in which case the tape will only extend for the length of that portion.

A tear tab 16 is shown being formed along and coextensive with an end portion of the length of tape 14. The length of the tab and correspondingly the length of the end portion of tape is not critically limited though it is usually an amount sufficient to allow a firm grip by the fingers. A similar criteria is generally used in determining the width of the tab.

The tab is formed by severing a portion of the film 12 along the edge 18 which forms a continuous contour while maintaining continuity between the film and the other edge of the tab. While the continuous contour of the edge 18 in FIGURE 1 is in the shape of a U, the particular shape is not critical and other shapes such as a V and that shown in FIGURE 4 can be used. However, irrespective of the shape of the continuous contour, the region 20 about each end of the edge forming the continuous contour must be thermally beaded, i.e. melted or softened and resolidified. Such beading is necessary to prevent premature tearing of the film in handling, shipping, or retailing the packaged article.

The above described severing to form the tab of this invention can be accomplished by cutting the film in the desired contour and then subsequently thermally beading the region about each end of the edge of the contour by an independent method such as exposure to radiant heat or contact with a heated member. However, it is generally most convenient to carry out the severing and reinforcing in one step which can be accomplished by simply melting the film and tape along a line which has the shape of the desired contour using a hot contoured knife or wire.

As particularly shown in FIGURE 3, when severing and beading is accomplished in one thermal step the entire length of the edge 18 and the edge of the adjacent film 22 are beaded. Additionally, when the one step operation is used, care must be taken to select a tear tape and film that can be easily severed by a hot knife or wire under the same conditions.

A particularly suitable apparatus for forming the tab depicted in FIGURE 1 is shown in FIGURES 7 and 8. In this apparatus a die 40, in the shape of a U, which has a heat source 42 adjacent to it is mounted within a cylinder 44 closed at one end. A vacuum line 46 is connected to cylinder 44 which joins the internal portion of said cylinder with a vacuum forming mechanism, not shown. The heat source 42 is supplied from an external source of electrical power, not shown, via a temperature control mechanism 48 receiving a thermal signal from a thermal detecting unit 50 mounted within the heat source 42. In operation, the lower, open end of the unit is placed over the area on the film where an opening is desired and the vacuum within the cylinder lifts a circular portion of the film away from the adjacent packaged article and against the hot die 40 (800° F. for 0.3 sec.) thus melting a U shaped hole in the film while preventing any damage to the packaged article.

FIGURE 2 shows the package of FIGURE 1 in a partially torn condition. The substantially parallel tears 24 are produced by pulling the tab 16 in a direction back along the tape 14 and away from the package 10.

Referring to FIGURES 4, 5, and 6 a fragmentary view of package 26 is shown wrapped with a thermoplastic film 28 sealed along the edges to provide a hermetically sealed container. The tear tape 30 and the tab 32 terminate at a heat sealed edge 38 of the package. As is more clearly shown in FIGURE 5 the tab edge 34 having ends 36 and the edge of the adjacent film are beaded along their entire lengths. This condition not only prevents premature tearing as described above, but additionally insures a hermetic seal along the tab edge and the edge of the adjacent film. Of course, if a wide heat sealing bar is used along the edge 38 the tab can be formed by simply cutting two incisions perpendicular to the edge insuring that the incisions do not go beyond the width of the hot seal.

Whenever a hermetically sealed package is desired and the tear tape terminates directly at a sealed edge, the particular tear tape used should be capable of being hermetically sealed to the thermoplastic film. This particular criteria is necessary to prevent minute holes in the package where the tear tape intersects and passes through the seal.

FIGURE 9 depicts a sealing and cutting bar that can be used to prepare the tab and edge seal of FIGURE 4. The heated bar 52 serves to hermetically heat seal the edge 38 of the film 28 while the heated appendages 54 sever the film 28 to form the tab 32. As is shown in FIGURES 4 and 5 the continuous contour of the edge 34 has the shape of a U with perpendicular corners, i.e. ⌐⌐. As previously stated other shapes can also be used.

To prepare the package of this invention any of a variety of well known packaging methods can be used. Of course, prior to the actual packaging, the tear tape is generally adhered to the nonfibrous flexible film. The preparation of the particular tear tab can be accomplished before actual packaging or as described above after the package has been prepared.

What is claimed is:

1. A package with tear tape opening means for producing a pair of substantially parallel tears comprising:

a web of polyethylene film as a wrapping material, a continuous length of polyvinyl chloride tape firmly adhered to the side of said web facing the contents of said package and positioned to be between said substantially parallel tears, said tape having a combined tensile strength and an adhesive shear strength greater than the tear strength of an equivalent width of said film, and a tear tab located along and substantially coextensive with an end portion of the length of said tear tape, said tab comprising a partially severed portion of said film having one edge continuous with said film and the other edge thereof forming a continuous contour in the shape of a U separated from said film, with the region about each end of the edge forming said continuous contour being thermally beaded.

2. The package of claim 1 wherein said continuous contour is in the shape of a U with perpendicular corners.

References Cited
UNITED STATES PATENTS

| | | | |
|---|---|---|---|
| 2,291,050 | 7/1942 | Malhiot | 229—51 |
| 2,699,285 | 1/1955 | Bell et al. | 229—51 |
| 2,771,385 | 11/1956 | Humphner | 229—51 |
| 2,998,911 | 9/1961 | Hahn et al. | 229—51 X |
| 3,175,752 | 3/1965 | Stabenow | 229—66 X |
| 3,201,258 | 8/1965 | Mastella | 229—51 X |

DONALD F. NORTON, *Primary Examiner.*